XR 3,919,669

United St

Hartemann

[11] 3,919,669

[45] Nov. 11, 1975

[54] SURFACE WAVE TRANSDUCER ARRAY AND ACOUSTO-OPTICAL DEFLECTOR SYSTEM OR FREQUENCY-SELECTIVE TRANSMISSION SYSTEM, UTILIZING THE SAME

[75] Inventor: Pierre Hartemann, Paris, France

[73] Assignee: Thomson-CSF, Paris, France

[22] Filed: Apr. 17, 1974

[21] Appl. No.: 461,709

[30] Foreign Application Priority Data

Apr. 20, 1973 France ............................ 73.14632

[52] U.S. Cl. ................ 333/30 R; 310/8.1; 310/9.8; 333/72; 350/161; 350/96 WG

[51] Int. Cl.$^2$ .. H03H 9/26; H03H 9/34; G02F 1/11; G02F 1/33

[58] Field of Search ....... 333/30 R, 72; 350/96 WG, 350/96 R, 160 R, 161; 310/8, 8.1, 8.2, 9.7, 9.8, 8.3

[56] References Cited

UNITED STATES PATENTS

| | | | |
|---|---|---|---|
| 3,568,102 | 3/1971 | Tseng | 333/30 R |
| 3,654,574 | 4/1972 | Dias | 333/30 R |
| 3,655,261 | 4/1972 | Chang | 350/96 WG |
| 3,836,876 | 9/1974 | Marshall et al. | 333/30 R |

OTHER PUBLICATIONS

Barrekette et al. — Multichannel Guide for ASW Memories in IBM Technical Disclosure Bulletin Vol. 14 No. 4 Sept. 1971; pp. 1295–1298.

*Primary Examiner*—James W. Lawrence
*Assistant Examiner*—Marvin Nussbaum
*Attorney, Agent, or Firm*—Cushman, Darby & Cushman

[57] ABSTRACT

The present invention relates to surface wave electromechanical transducers. In accordance with the invention, there is provided a surface wave transducer array wherein the radiator elements comprise electrodes of interdigitated comb type whose teeth are curved to follow arcs whose circumferences are disposed in concentric pairs. This transducer array is applicable in particular to the emission of surface-elastic waves, to acousto-optical deflector systems and to frequency-selective transmission systems.

14 Claims, 9 Drawing Figures

3919669
OR IN 333/30R

SURFACE WAVE TRANSDUCER ARRAY AND ACOUSTO-OPTICAL DEFLECTOR SYSTEM OR FREQUENCY-SELECTIVE TRANSMISSION SYSTEM, UTILIZING THE SAME

The present invention relates to arrays of electromechanical transducer elements designed to radiate or to pick up elastic surface waves propagating at the surface of a substrate. Surface waves can be utilized as a means of transmitting signals through electromechanical delay lines and also as a means of deflecting electromagnetic waves in particular in acousto-optical deflector devices. It is well known to design a surface elastic wave transducer commencing from a piezoelectric substrate at whose surface comb shaped interdigital electrodes are formed by photochemical etching techniques in a previously deposited conductive layer. The comb teeth are rectilinear and mutually parallel in alignment, in order to achieve a main radiation lobe which has a fixed direction of small apertural angle. By arranging two interdigital comb-shaped structures end to end on one and the substrate, a delay line is produced which can be dispersive or non-dispersive, as the case may be. Using a single comb structure associated with an optical waveguide, it has been found possible to create an acousto-optical interaction which has been utilised to modify the direction of a monochromatic beam of electromagnetic energy.

Due to the use of rectilinear teeth, the known kinds of transducer combs form arrays of highly directive radiator elements. The result is that the properties of these arrays are not effectively exploitable except in the fixed direction in which the radiator elements project the elastic surface waves. The propagation of the vibrational waves takes place at the substrate surface so that ultimately there is only one possible direction in which to execute surface wave energy transmission. In addition, if one considers an application based upon acousto-optical interaction between the elastic surface waves and a beam of electromagnetic energy, the only parameter which can be influenced is the variation in the frequency of the elastic surface wave.

In order to expand the possibilities of exploitation of a surface elastic wave array of radiator elements, the invention provides for the radiator elements building up said array to be quasi-isotropic within a substantially wider angle of radiation than that obtained with radiator elements having rectilinear teeth. To this end, the comb teeth corresponding with each of the radiator elements are given the form of concentric arcs.

An array of curved teeth type sources, is capable of emitting a main radiation lobe which makes a variable angle with the direction of the axis of the array or source alignment, and this angle changes when the frequency of the excitation voltage simultaneously applied to the elementary sources of the array, is varied. The expansion of the possible methods of utilisation of surface elastic wave transducer arrays, opens upu the avenue to novel frequency-selective surface wave transmission structures, and makes it possible to achieve improved operation of surface wave acousto-optical deflector devices.

In accordance with an object of the present invention, there is provided an electromechanical transducer array for launching and receiving elastic surface waves propagating along the surface of a piezoelectric substrate, said electromechanical transducer array comprising: a plurality of radiator elements carried by said surface, and electrical conductor means for connecting with one another said radiator elements; each of said radiator elements being made of at least two coplanar electrodes separated from one another by a curvilinear radiation gap having a phase center positioned on the axis of said electromechanical transducer array; said coplanar electrodes forming with said electrical conductor means interdigitated comb spaced structures having curvilinear teeth.

A further object of the invention is a surface wave acousto-optical deflector system for deflecting a beam of radiant energy under the action of a beam of ultrasonic energy launched by a surface wave electromechanical transducer, said optical deflector system comprising: a piezoelectric substrate having a surface carrying said surface wave electromechanical transducer, a layer of refractory material deposited upon said surface for guiding said beam of radiant energy, and a.c. generator means connected to said surface wave electromechanical transducer; said surface wave electromechanical transducer comprising an array of radiator elements carried by said surface, and electrical conductor means fed from said a.c. generator means and connecting with one another said radiator elements; each of said radiator elements being made of at least two coplanar selectrodes separated from one another by a curvilinear radiating gap having a phase center positioned on the axis of said array; said coplanar electrodes forming with said electrical conductor means interdigitated comb shaped structures having curvilinear teeth.

A still further object of the invention is a surface wave frequency-selective transmission system comprising: a piezoelectric substrate, an electromechanical transducer array, capable of launching along the surface of said piezoelectric substrate a beam of ultrasonic energy, a set of auxiliary surface wave transducers arranged on said surface in fantail fashion and capable of successively collecting said beam of ultrasonic energy and electrical transmission means coupled to the respective terminals of said auxiliary surface wave transducers.

For a better understanding of the present invention, and to show how the same may be carried into effect, reference will be made to the ensuing description and the attached figures among which:

Figure 1:
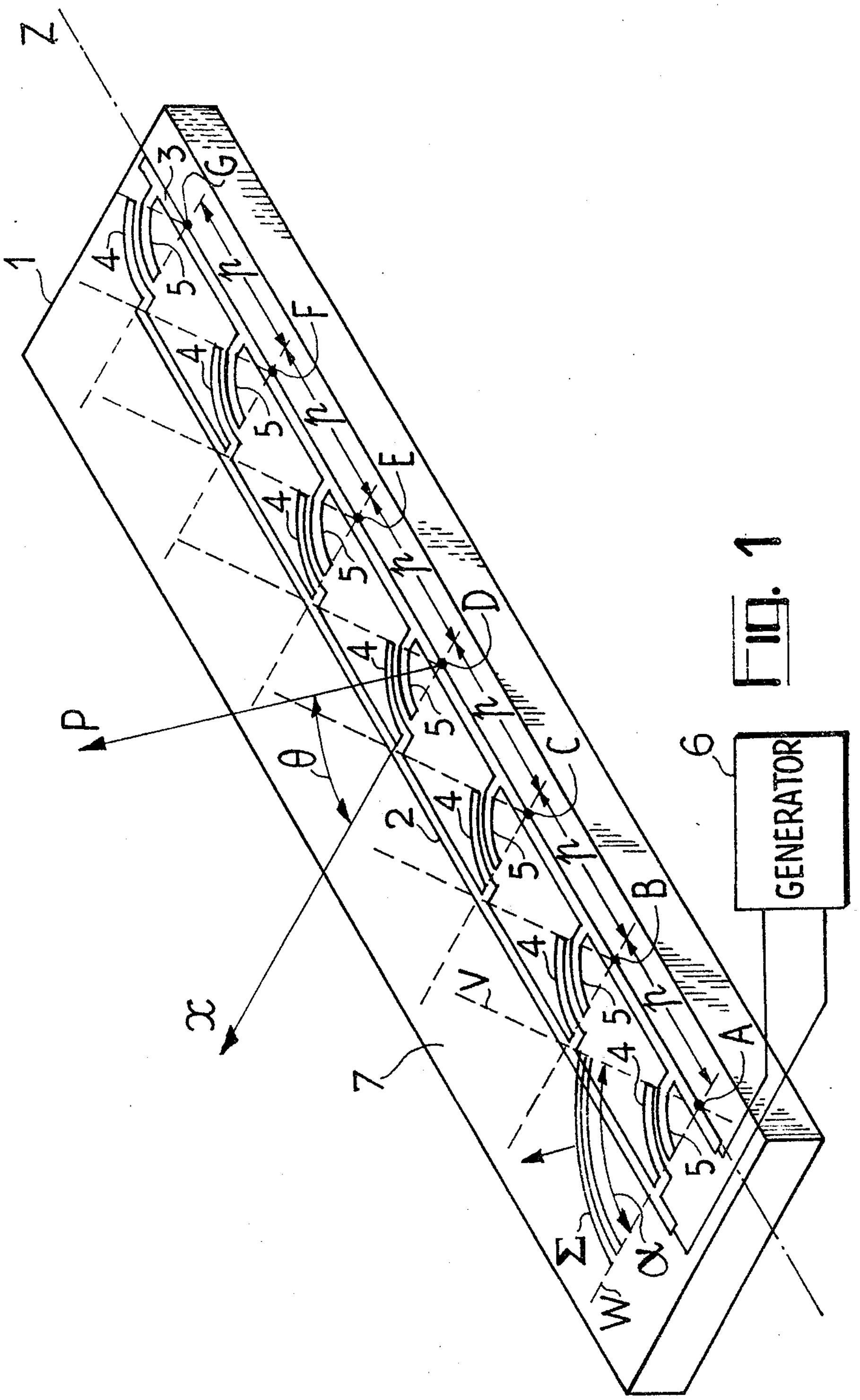
FIG. 1 is an isometric view of a transducer array in accordance with the invention.

In FIG. 1, there can be seen an isometric view of a transducer array made of radiator elements with curved teeth. This transducer array makes it possible to radiate surface elastic waves in a direction P which makes an angle with the longitudinal axis Z of the array.

The transducer array is formed at the surface 7 of a piezoelectric substrate 1 by photochemical etching of a conductive deposit certain parts of which have been left behing and follow contour of a pair of interdigitated comb structures. The teeth 4 and 5 of the two comb structures are arranged in the form of concentric arcs whose respective geometric centers are defined by the points A, B, C, D, E, F and G located upon the longitudinal axis Z of the array. Between two corresponding teeth 4 and 5 in the two combs, there is a curved gap. This gap is the source of an inductor electric field if a voltage is applied through the medium of the conductive edges 2 and 3 which respectively connect to one another the teeth 4 and the teeth 5.

The voltage applied to the array is an alternating voltage produced by a generator 6. Under the effect of this alternating voltage and as a consequence of the piezoelectric properties of the substrate, the curved interdigital gaps behave as radiator elements whose respective phase centres are the points A, B, C, D, E, F and G.

The vibrational energy Σ projected by the radiator elements has a substantially circular wave front within the angle deliminated by the directions WA and VA.

Figure 5:
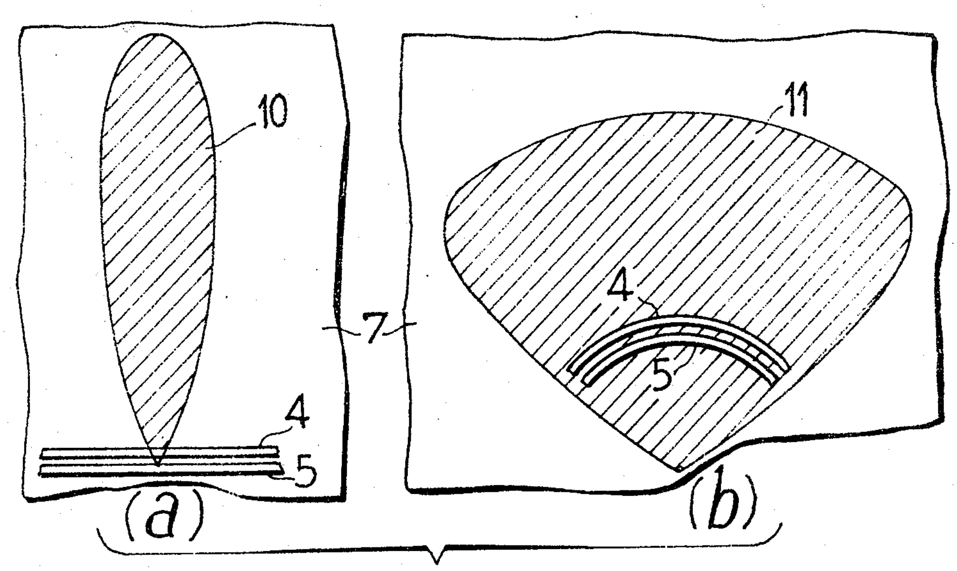
FIGS. 5 and 6 are explanatory diagrams.

Within the limits of the emission angle $\alpha$, this energy apparently emanates from an isotropic point source coincidental with the phase center of each radiator element. The main radiation lobe of a radiator element therefore takes the form of a circular sector marked (b), in FIG. 5. By contrast, if the comb teeth were rectilinear, the marked directivity of the radiator element would lead to the radiation lobe marked (a) in FIG. 5. It will be seen from a consideration of FIG. 5 that the radiation lobe 11 makes it possible to treat the curved radiator elements as point sources, at any rate within the confines of the emission angle $\alpha$; this is not the case for the lobe 10 which corresponds to rectilinear radiator elements.

In FIG. 1, the points A to G have been assumed to be equidistantly spaced, $p$ being the pitch of the array; the axis $x$ represents the normal to the array and $\theta$ the angle of emergence of the overall radiation $P$. It is well known from the theory of radiation that the array of point sources A to G produces, in the direction $\theta$, a radiation of wavelength $\lambda$ whose intensity $P$ is given by the expression:

$$P = P_o \frac{\sin n \left(\frac{\pi p}{\lambda} \sin \theta\right)}{\sin \left(\frac{\pi p}{\lambda} \sin \theta\right)}$$

where it has been assumed that $n$ sources are emitting inphase, this being the case in FIG. 1.

This formula, which is valid for isotropic sources, can be employed in the present case if the radiation direction P is located within the angle $\alpha$. This is clear from the principle of multiplication of radiation patterns as demonstrated by M. SILVER.

By contrast, if we consider a radiation direction located outside the angle $\theta$, the radiation intensity ceases to obey the aforesaid equation and tends to disappear rapidly.

Within the angle $\alpha$ of constant emission level, it will be seen that the array emits a radiation $P$ whose angle of emergence $\theta$ is a function of the frequency $f$ of the supply voltage produced by the generator 6. In effect, we have the situation $\lambda = c/f$ where $c$ is the phase velocity of the surface waves. The frequency band $\Delta f$ required to sweep the angle $\alpha$, can readily be calculated from the above expressions, taking account of the fact that the radiation peak occurs when: $P = n\ P_o$.

Figure 2:
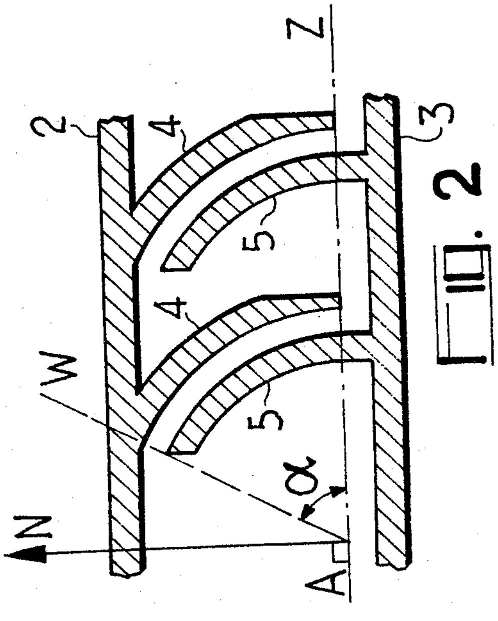
FIG. 2 illustrates a variant embodiment of the array shown in FIG. 1.

Without departing from the scope of the invention, it is equally possible to arrange the curved teeth 4 and 5 in such a fashion as to achieve a variable-pitch source array of the kind shown in FIG. 2. In this case, the radiation of the variable-pitch array is produced in a direction which scans the angle $\alpha$ with a frequency variation greater than that which is required by a constant pitch arrangement. In other words, the variable-pitch array of FIG. 2 is equivalent to several successive sets of constant-pitch arrays which are progressively narrower and narrower. The scanning of the angle of emission $\alpha$ which is common to these sets, thus takes place in several staggered frequency ranges which occupy a wider frequency band than that which would be required for an array of the same composition and extent but of constant pitch.

Whatever the nature of the array used, there is always a radiation peak in the direction normal to the array. This radiation fraction being emitted in a fixed direction, there is no point in keeping. To exclude this radiation mode, the invention provides for angular limitation of the extent of the curved teeth in the manner shown in FIG. 3.

Figure 3:
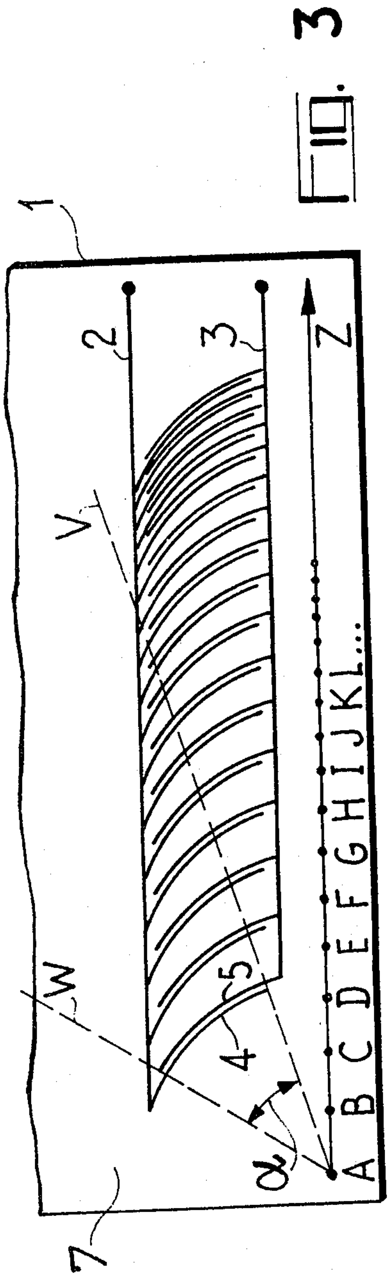
FIG. 3 illustrates a detail of the arrays shown in FIGS. 1 and 2.

In FIG. 3, the teeth 4 and 5 are delimited by the angle $\alpha$ which is defined by the directions AW and AV. The normal N to the longitudinal axis Z of the array is disposed, by construction outside the angle $\alpha$ in order to prevent the array from radiating the unwanted mode normally in relation to its axis.

In FIGS. 1 and 2 discussed earlier, it has been assumed that the array axis is rectilinear, although the invention is far from limited to this particular case.

Figure 4:
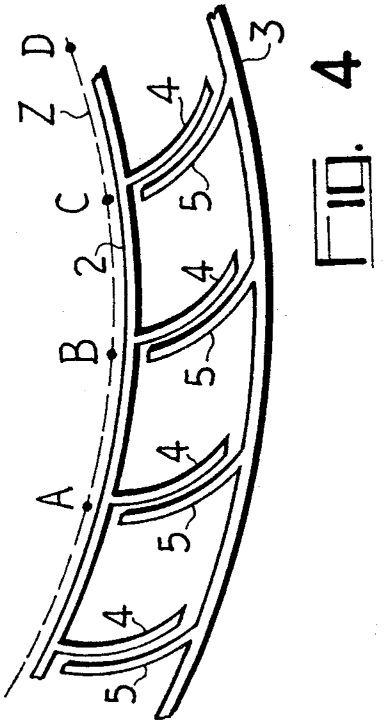
FIG. 4 illustrates another varient embodiment of the array shown in FIG. 1.

In FIG. 4, a surface elastic wave transducer array can be seen, whose axis Z is curvilinear. This solution makes it possible to cause the radiation issuing from the array to converge, whilst ensuring, by the variation of the frequency supply, either that the orientation changes within a fixed zone of convergence, or that the zone of convergence displaces within the plane containing the array.

The transducer arrays with curved teeth, hereinbefore described, can advantageously be utilised in particular in surface wave acousto-optical deflector systems.

Figure 7:
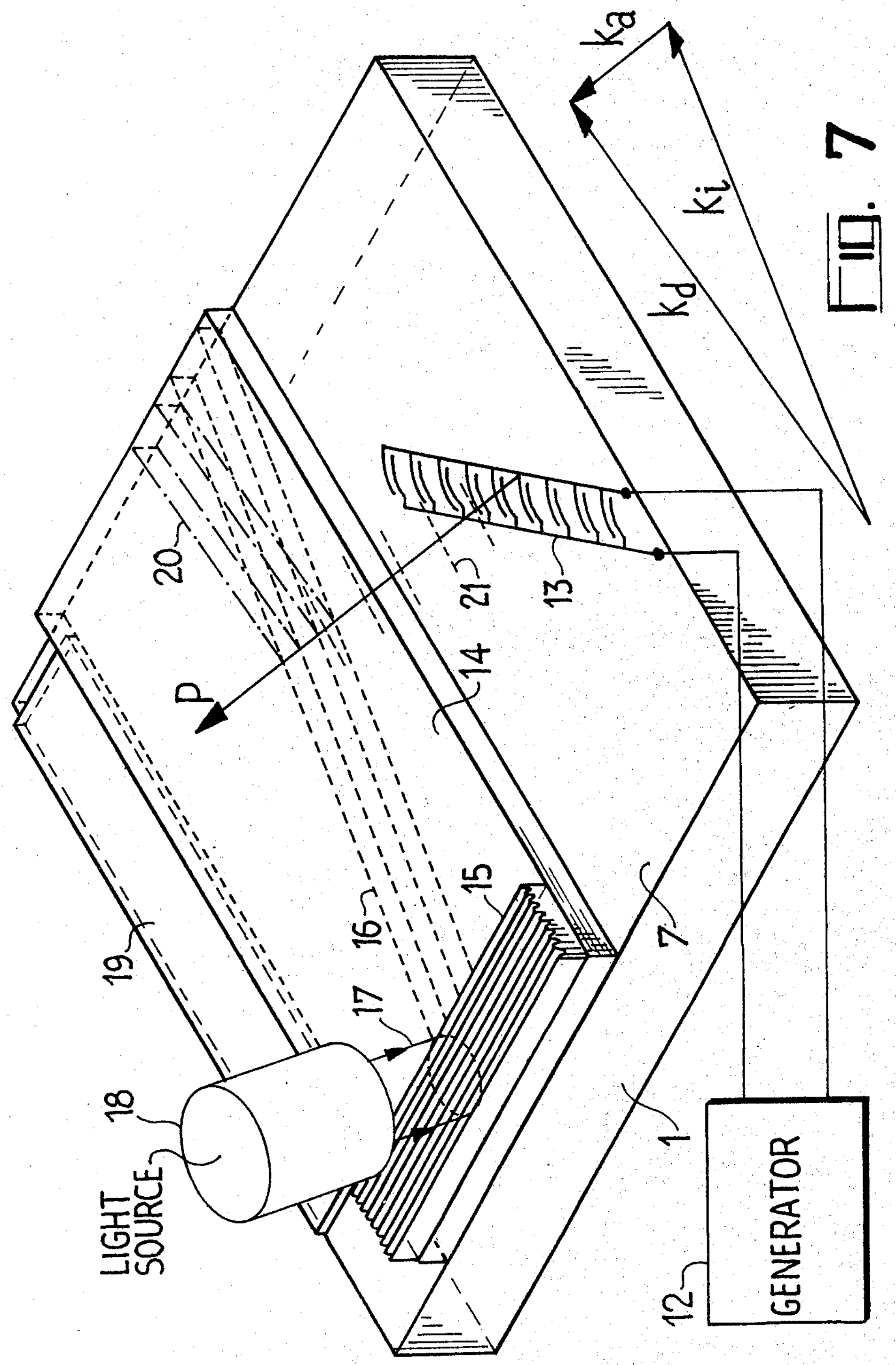
FIG. 7 illustrates an acousto-optical deflector in accordance with the invention.

In FIG. 7, an isometric view of an acousto-optical deflector system in accordance with the invention cam be seen.

It consists of a piezoelectric substrate 1, for example of quartz, at the surface 7 of which there has been produced by photochemical etching of a conductive deposit, a surface elastic wave transducer array 13. An alternating generator 12 excites the array 13 which projects acoustic radiation P, marked, in FIG. 7 by the wave fronts 21 and by the wave vector $\vec{k_a}$. By varying the frequency of the generator 12, the wave vector $\vec{k_a}$, is made to change its length and orientation. The surface 7 of the substrate 1 is coated opposite the array 13 with a thin film 14 of glass, acting as an optical waveguide; the refractive index $n_1$ of the film 14 will for example be higher than the effective index $n_o$ of the substrate in order to achieve conditions of total reflection vis-a-vis a guided electromagnetic wave propagating obliquely between the glass-substrate and air-glass interfaces. The electromagnetic wave is made to travel obliquely between the broad faces of the guide film 14, by means of an optical coupling device 15 which can be constituted for example by a phase grating deposited upon the film 14.

The guided electromagnetic energy will be produced by a source 18 constituted, for example, by a helium-neon laser emitting a beam 17 which illuminates the phase grating 15. Under the diffractive action of the phase grating 17, a fraction of the electromagnetic energy projected by the source 18 experiences a change in orientation and is refracted subsequently at the interface between the grating 15 and the optical guide film 14. The result is the formation in the film 14 of a beam 16 of guided electromagnetic energy which comes up against the acoustic radiation P.

The beam 16 is characterised by its optical wave vector $\vec{k}_i$ prior to the interaction between the optical and acoustic waves. The acousto-optical interaction between the waves $\vec{k}_a$ and $\vec{k}_i$ gives rise to a diffracted optical wave vector $\vec{k}_d$ which is the sum of the vectors $\vec{k}_i$ and $\vec{k}_a$. Leaving aside the undiffracted portion of the electromagnetic energy contained in the beam 16, it will be seen that the acoustic radiation P projected by the transducer array 13 has consequently had to deflect the remainder of the energy in the direction of the diffracted beam 20. The acousto-optical interaction is explained by the formation of an index grating in the guide film 14; this index grating results from the mechanical stresses created by the surface elastic waves which propagate along the interface between the substrate 1 and the associated face of the film 14. After clearing that portion of the surface upon which the film 14 is carried, the surface elastic waves are absorbed by an acoustic load 19 arranged on the surface 7 of the substrate downstream of the film 14. This acoustic load 19 may be constituted for example by an adhesive strip of thermoplastic material.

The beam 16 is characterized by its optical wave vector $\vec{k}_i$ prior to the interaction between the optical and acoustic waves. The acousto-optical interaction between the waves $\vec{k}_a$ and $\vec{k}_i$ gives rise to a diffracted optical wave vector $\vec{k}_d$ which is the sum of the vectors $\vec{k}_i$ and $\vec{k}_a$. Leaving aside the undiffracted portion of the electromagnetic energy contained in the beam 16, it will be seen that the acoustic radiation P projected by the transducer array 13 has consequently had to deflect the remainder of the energy in the direction of the diffracted beam 20. The acousto-optical interaction is explained by the formation of an index grating in the guide film 14; this index grating results from the mechanical stresses created by the surface elastic waves which propagate along the interface between the substrate 1 and the associated face of the film 14. After clearing that portion of the surface upon which the film 14 is carried, the surface elastic waves are absorbed by an acoustic load 19 arranged on the surface 7 of the substrate downstream of the film 14. This acoustic load 19 may be constituted for example by an adhesive strip of thermoplastic material.

Figure 6:
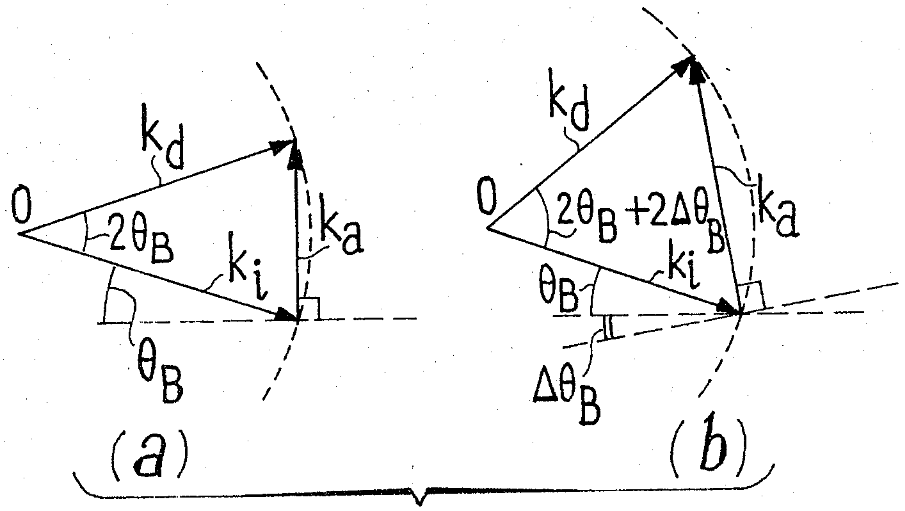

The acousto-optical interaction upon which the operation of the deflector system shown in FIG. 7, is based, has been graphically illustrated by the vector diagrams (a) and (b) of FIG. 6. These diagrams correspond to the case in which the frequency of the generator 12 changes from a value $F_o$ to a higher value $F_1$. We may assume, by way of non-limitative example, that the pitch of the transducer array 13 has been chosen to be 1.25 times the wavelength $\lambda_o$ corresponding to the frequency $F_o$. Under these conditions, the change of the frequency $F_o$ to the frequency $F_1$, brings about a rotation in the radiation direction P in the trigonometric sense.

The diagrams (1) of FIG. 6 represents the wave vectors $\vec{k}_i$, $\vec{k}_d$ and $\vec{k}_a$ at the frequency $F_o$; it has been constructed by arranging for the moduli of the vectors $\vec{k}_i$ and $\vec{k}_d$ to be equal because in that way the optical deflection is not accompanied by any change in frequency; this latter result is achieved by arranging the ends of the vector $\vec{k}_a$ on a circumference whose radii are the vectors $\vec{k}_i$ and $\vec{k}_d$.

As the frequency of the surface elastic waves changes from $F_0$ to $F_1$, the diagram (b) of FIG. 6 is obtained. This diagram has been constructed in order to satisfy the condition of non-variation of the optical frequency, and it will be seen that it is necessary for the new wave vector $\vec{k}_a$ to have changed its orientation and modulus so that its ends remain upon the aforementioned dotted circumference. This result can be achieved by adjusting the spacing of the teeth of the comb structure in the transducer array 13 and, if required, by varying said spacing along the array in order to provide for a wider range of frequency variation bearing in mind the rotation which the wave vector $\vec{k}_a$ is to undergo.

The diagrams (a) and (b) of FIG. 6 illustrate the relationship linking the wave vectors $\vec{k}_a$, $\vec{k}_i$ and $\vec{k}_d$ in order to contrive that the deflection angle changes from a value $2\ \theta_B$ to an angle $2\ (\theta_B + \Delta\theta_B)$ under the influence of a frequency variation between $F_0$ and $F_1$.

It is then necessary to consider the fact that the interaction takes place with a certain efficiency which must not vary when the diffracted beam 20 changes orientation. This presumes that the vibrational amplitude of the surface elastic waves does not vary when their direction changes. It will readily be appreciated that with rectilinear comb teeth, the radiation lobe 10 of a radiator element such as shown at (a) in FIG. 5, does not make it possible to guarantee invariance in the amplitude of the surface elastic waves when their direction changes. By contrast with the curved comb teeth of the invention, it will be seen from the lobe 11 shown at (b) in FIG. 5, that the requisite invariance is achieved and that the result is a constant diffraction efficiency on the part of the acousto-optical deflector. It goes without saying that having created a constant-efficiency acousto-optical deflector, it is nevertheless possible to act upon the amplitude of the voltage produced by the generator 12 in order to modulate the amplitude of the diffracted optical wave. This facility is offered by the acousto-optical deflector of FIG. 7 and it can be utilised not only to deflect a beam of radiant energy but also to modulate its amplitude. If the condition of equality between the moduli of the wave vectors $\vec{k}_i$ and $\vec{k}_d$ is not chosen as the basis, then it is equally possible to utilize the device shown in FIG. 7 to frequency modulate an optical carrier wave with or without associated deflection.

It will be seen from a consideration of FIG. 7 that the device shown has a monolithic structure and that it can be designed utilizing a technique of construction directly derived from that used for the construction of the integrated circuits. Thus, it is possible to conceive of a system of integrated optical design, which, by way of structural element, incorporates an acousto-optical device such as that illustrated in FIG. 7. It will be observed, equally, that the phase grating 15 is nothing more or less than an optical coupling element and that it needs only be provided in order to feed in or pick up the electromagnetic energy propagating through the optical waveguide 14.

The manufacture of the device shown in FIG. 7 presents no major problem. By way of non-limitative example, an acousto-optical deflector system can be produced commencing from a quartz substrate upon which, using cathode-sputtering, there is deposited an optical waveguide of light barium crown glass. The transducer network is produced by the conventional photo-etching method involving etching of an aluminum film 4000 A in thickness, deposited under vacuum. The optical coupling grating is produced by exposure and chemical processing of a 6000 A thick film of photosensitive resin. By exposing this resin to the action of a pattern of light fringes having an interfringe interval in the order of 0.6 $\mu$m a deep impression of 600 A can be produced which is capable of coupling the optical radiation issuing from a helium-rear laser, to the optical waveguide. The optical waveguide, in the example in question, is deposited in a thickness in the order of 2 $\mu$m and the surface elastic waves designed to produce the acousto-optical interaction, have a frequency of several hundreds of megahertz.

The surface elastic wave transducer array can furthermore advantageously be utilized in a frequency-selective transmission system, in particular for the design of electromechanical delay lines or for spectral analysis of electrical signals.

Figure 8:
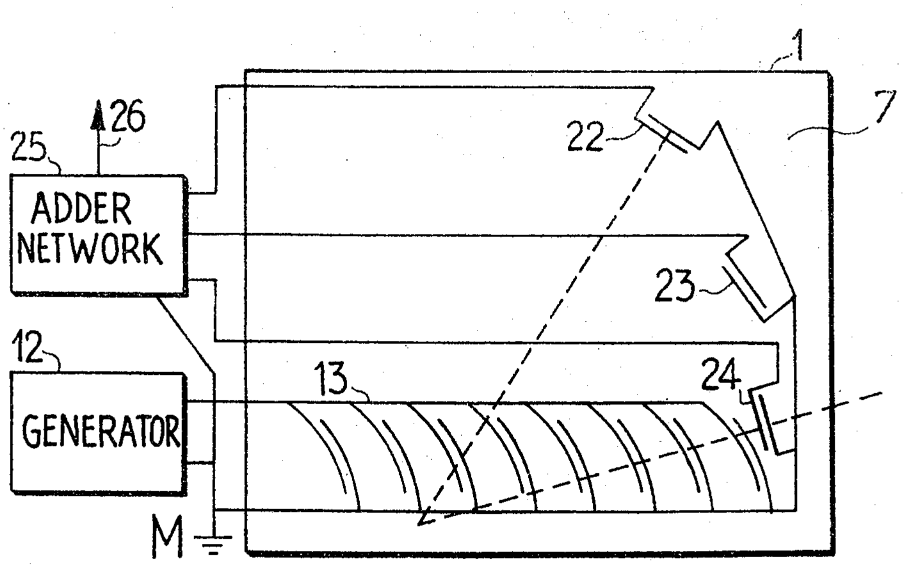
FIG. 8 illustrates a frequency-selective transmission system in accordance with the invention.

In FIG. 8, a surface elastic wave transmission system can be seen, comprising a piezoelectric substrate 1 at the surface 7 of which there has been formed by a photo-etching technique involving a conductive deposit, a transducer array 13 comprising curved teeth and several auxiliary surface wave transducers 22, 23, 24.

If, for example to the array 13, the alternating voltage supplied by the generator 12 is applied; acoustic radiation is projected in a direction contained within the angle of emission shown in broken line. The direction of this radiation varies with the frequency of excitation of the array 13 and can thus be selectively received by one of the auxiliary transducers 22, 23 or 24. The transducers 22, 23 and 24 are of fantail design so that their excitation by the surface waves is a frequency-selective operation; the voltages which they produce are a function of the various trajectories adopted by the ultrasonic radiation. It is possible to add the voltages produced by the auxiliary transducers 22, 23 and 24 in an adder circuit 25; at the output 26 of the adder circuit 25 a voltage which is delayed in relation to the voltage applied to the array 13 is obtained and if the distances of the wave receivers in relation to the phase center of the array 13 are differentiated, it is possible to obtain a delay dispersion characteristic as a function of frequency, which makes of the system shown in FIG. 8, disregarding the generator 12, a dispersive delay line. Without departing from the scope of the invention, the voltages produced by the wave receivers 22, 23 and 24 can respectively be used to control instruments upon which it is possible to read the spectral content of an incident signal applied to the array 13.

In the case shown in FIG. 8, the surface wave transducer array is a constant-pitch array.

Figure 9:
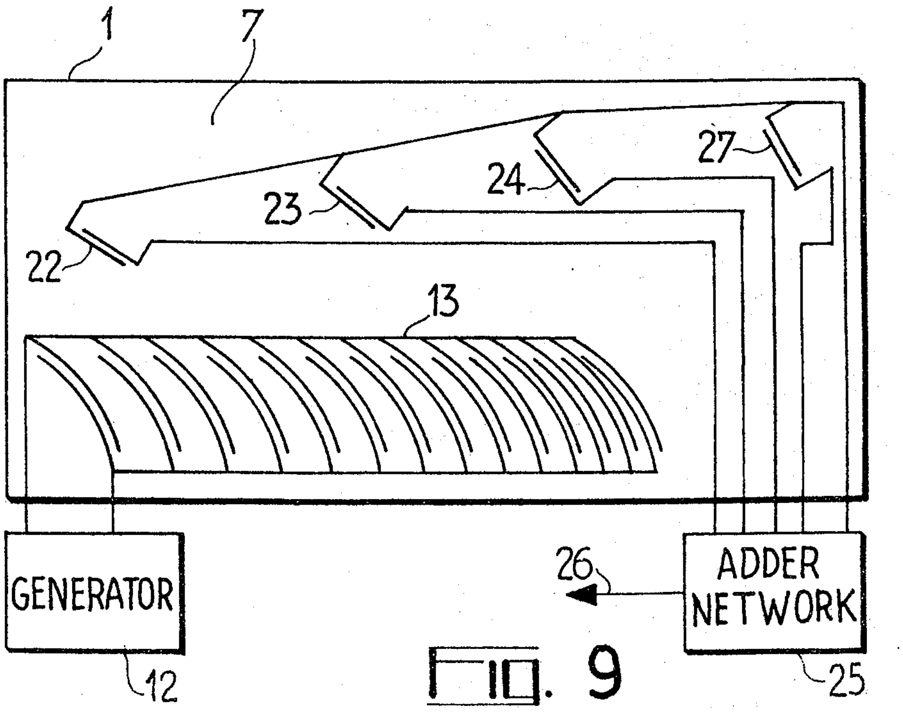
FIG. 9 illustrates a variant embodiment of the transmission system shown in FIG. 8.

In FIG. 9, a frequency-selective transmission system similar to that of FIG. 8 can be seen but which associates with a variable-pitch transducer array 13 a system of auxiliary transducers 22, 23, 24 and 27 which are deployed in fantail fashion in the zone of the emission of the array 13.

With an eye to simplification, in FIGS. 8 and 9 the means used to absorb the elastic surface waves, and normally placed downstream of the auxiliary transducers, have been omitted.

It goes without saying that the systems shown in FIGS. 8 and 9 are capable of operation in the reverse sense. In this case, the transducers 22, 23, 24, 27 become emitters and the transducer array 13 serves to pick up the emitted surface elastic waves. It should also be pointed out that the transducers 22, 23, 24 and 27 could be distributed either at the convex side of the teeth of the transducer array 13, or at the concave side thereof. This remark applies in general to any curved tooth transducer array whose radiator elements have fixed-interval phase centres.

What I claim is:

1. Electromechanical transducer array for launching and receiving elastic surface waves propagating along the surface of a piezoelectric substrate, said electromechanical transducer array having an axis lying within said surface, said electromechanical transducer array comprising: a plurality of radiator elements carried by said surface and electrical conductor means for connecting with one another said radiator elements; each of said radiator elements being made of at least two coplanar electrodes separated from one another by a curvilinear radiating gap having a phase center positioned on said axis; said coplanar electrodes forming with said electrical conductor means interdigitated comb shaped structures having curvilinear teeth.

2. Electromechanical transducer array as claimed in claim 1, wherein the respective phase center of said radiator elements are located equidistantly from one another on said axis.

3. Electromechanical transducer array as claimed in claim 1, wherein the respective phase centers of said radiator elements are located upon said axis at intervals diminishing from one end to the other of said axis.

4. Electromechanical transducer array as claimed in claim 1, wherein said axis is rectilinear.

5. Electromechanical transducer array as claimed in claim 1, wherein said axis is curvilinear.

6. Electromechanical transducer array as claimed in claim 1, wherein said curvilinear radiating gap is disposed to one side of the normal to said axis; said normal being contained in said surface, and the phase center of said curvilinear radiating gap lying on said normal.

7. Surface wave acousto-optical deflector system for deflecting a beam of radiant energy under the action of a beam of ulltrasonic energy launched by a surface wave electromechanical transducer, said optical deflector system comprising: a piezoelectric substrate having a surface carrying said surface wave electromechanical transducer, a layer of refractory material deposited upon said surface for guiding said beam of radiant energy, and a.c. generator means connected to said surface wave electromechanical transducer; said surface wave electromechanical transducer comprising an array of radiator elements carried by said surface, and electrical conductor means fed from said a.c. generator means and connecting with one another said radiator elements; said array having an axis lying within said surface; each of said radiator elements being made of at least two coplanar electrodes separated from one another by a curvilinear radiating gap having a phase center positioned on said axis; said coplanar electrodes forming with said electrical conductor means interdigitated comb shaped structures having curvilinear teeth.

8. Surface wave acousto-optical deflector system as claimed in claim 7, wherein means for absorbing said beam of ultrasonic energy are arranged on said surface.

9. Surface wave acousto-optical deflector system as claimed in claim 7, further comprising optical coupling means arranged on said layer.

10. Surface wave acousto-optical deflector system as claimed in claim 7, wherein said a.c. generator means produce a variable frequency alternating voltage.

11. Surface wave acousto-optical deflector system as claimed in claim 10, wherein said a.c. generator is an amplitude modulated generator.

12. Surface wave frequency selective transmission system comprising: a piezoelectric substrate, an electromechanical transducer array capable fo launching along the surface of said piezoelectric substrate a beam of ultrasonic energy, a set of auxiliary surface wave transducers arranged on said surface in fantail fashion and capable of successively collecting said beam of ultrasonic energy and electrical transmission means coupled to the respective terminals of said auxiliary surface wave transducers; said electromechanical transducer array having an axis lying within said surface; said electromechanical transducer array comprising: a plurality of radiator elements carried by said surface and electrical conductor means for connecting with one another said radiator elements; each of said radiator elements being made of at least two coplanar electrodes separated from one another by a curvilinear radiating gap having a phase center positioned on said axis; said coplanar electrodes forming with said electrical conductor means interdigitated comb shaped structures having curvilinear teeth.

13. Surface wave frequency-selective transmission system as claimed in claim 12, wherein said auxiliary surface wave transducers are interdigitated comb-shaped transducers.

14. Surface wave frequency-selective transmission system as claimed in claim 12, wherein said auxiliary surface wave transducers are supplied with the same excitation signal; said electromechanical transducer array operating as a surface wave receiver.

* * * * *